(12) United States Patent
Oliveira et al.

(10) Patent No.: US 9,975,197 B2
(45) Date of Patent: May 22, 2018

(54) DEVICE AND PROCESS FOR SIMULTANEOUS SHAPING AND WELDING OF CONNECTOR PIPES FOR COMPRESSORS

(71) Applicant: Whirlpool S.A., São Paulo (BR)

(72) Inventors: Moises Alves de Oliveira, Joinville (BR); Sergio Luiz Maganhoto, Joinville (BR)

(73) Assignee: Whirlpool, S.A., Sao Paulo (BR)

( * ) Notice: Subject to any disclaimer, the term of this patent is extended or adjusted under 35 U.S.C. 154(b) by 373 days.

(21) Appl. No.: 14/414,219

(22) PCT Filed: Jun. 18, 2013

(86) PCT No.: PCT/BR2013/000214
§ 371 (c)(1),
(2) Date: Jan. 12, 2015

(87) PCT Pub. No.: WO2014/008563
PCT Pub. Date: Jan. 16, 2014

(65) Prior Publication Data
US 2015/0183048 A1    Jul. 2, 2015

(30) Foreign Application Priority Data

Jul. 12, 2012 (BR) ..................... 10 2012 017 2798

(51) Int. Cl.
*B23K 11/14* (2006.01)
*B23K 11/16* (2006.01)
(Continued)

(52) U.S. Cl.
CPC .......... *B23K 11/0046* (2013.01); *B23K 11/14* (2013.01); *B23K 11/34* (2013.01);
(Continued)

(58) Field of Classification Search
CPC ..... B23K 11/0046; B23K 11/14; B23K 11/16; B23K 2201/01; B23K 2201/14;
(Continued)

(56) References Cited

U.S. PATENT DOCUMENTS 2,585,044 A * 2/1952 Sanders ................. H01J 43/30
250/207
2,614,198 A * 10/1952 Avery ................ B23K 11/3081
219/107
(Continued)

FOREIGN PATENT DOCUMENTS

BR    PI0603392-0     4/2008
CN    101780602       7/2010
(Continued)

OTHER PUBLICATIONS

International Search Report for International Application No. PCT/BR2013/000214, dated Oct. 11, 2013.

*Primary Examiner* — Darren W Gorman
*Assistant Examiner* — Joseph A Greenlund
(74) *Attorney, Agent, or Firm* — Harrington & Smith

(57) ABSTRACT

The present invention relates to a shaping and welding device and process of connector pipes or dowels (1) primarily intended for use in compressors. More specifically the process presented here concerns the shaping and welding of copper pipes (1) used as connectors for suction, discharge and process, the metal housing (2) of hermetic compressors, with the goal of making this equipment much more practical, efficient and economical.

19 Claims, 5 Drawing Sheets

(51) Int. Cl.
  *B23K 11/34* (2006.01)
  *F04B 39/12* (2006.01)
  *B23K 11/00* (2006.01)
  *F04C 29/12* (2006.01)
  *B23K 101/04* (2006.01)
  *B23K 101/14* (2006.01)
  *F04C 23/00* (2006.01)

(52) U.S. Cl.
  CPC ............ *F04B 39/12* (2013.01); *F04B 39/121* (2013.01); *F04B 39/123* (2013.01); *F04C 29/12* (2013.01); *B23K 11/16* (2013.01); *B23K 2201/04* (2013.01); *B23K 2201/14* (2013.01); *F04C 23/008* (2013.01); *F04C 2230/231* (2013.01); *F04C 2230/604* (2013.01); *F04C 2240/806* (2013.01)

(58) Field of Classification Search
  CPC ........ B23K 11/34; F04B 39/12; F04B 39/121; F04B 39/123; F04C 2230/231
  USPC ............... 219/59.1, 78.16, 93, 103, 104, 116
  See application file for complete search history.

(56) References Cited

U.S. PATENT DOCUMENTS

| | | | | |
|---|---|---|---|---|
| 2,623,974 | A * | 12/1952 | Prucha | F16B 37/061 219/93 |
| 2,731,535 | A * | 1/1956 | Grey | B23K 11/0053 219/119 |
| 3,219,790 | A * | 11/1965 | Johnson | B23K 11/14 219/93 |
| 3,374,529 | A * | 3/1968 | Osborn, Jr. | B23K 13/00 219/611 |
| 4,322,598 | A * | 3/1982 | Blair | F16L 5/022 219/107 |
| 4,609,805 | A * | 9/1986 | Tobita | B23K 11/0053 219/119 |
| 5,248,869 | A * | 9/1993 | DeBell | B23K 37/06 219/158 |
| 5,416,288 | A * | 5/1995 | Widmer | B23K 11/008 219/108 |
| 6,008,463 | A * | 12/1999 | Aoyama | B23K 11/004 219/119 |
| 6,163,004 | A * | 12/2000 | Aoyama | B23K 11/14 219/148 |
| 6,303,893 | B1 * | 10/2001 | Perks | B23K 11/14 219/86.24 |
| 6,552,294 | B1 * | 4/2003 | Ananthanarayanan | B23K 11/002 219/107 |
| 6,689,981 | B1 * | 2/2004 | Ananthanarayanan | B23K 11/002 219/59.1 |
| 6,717,091 | B2 * | 4/2004 | Ananthanarayanan | B23K 11/0935 219/59.1 |
| 6,791,051 | B2 * | 9/2004 | Ananthanarayanan | B23K 11/002 219/59.1 |
| 6,791,052 | B1 * | 9/2004 | Ananthanarayanan | B23K 11/002 219/59.1 |
| 6,847,001 | B2 * | 1/2005 | Ananthanarayanan | B23K 11/02 219/59.1 |
| 6,875,944 | B2 * | 4/2005 | Ananthanarayanan | B23K 11/004 219/59.1 |
| 7,253,372 | B2 * | 8/2007 | Ananthanarayanan | B23K 11/002 219/59.1 |
| 7,291,801 | B2 * | 11/2007 | Aoyama | B23K 9/20 219/89 |
| 7,323,653 | B2 * | 1/2008 | Ananthanarayanan | B23K 11/0935 219/59.1 |
| 7,385,156 | B2 * | 6/2008 | Nozue | B23K 11/02 219/101 |
| 7,423,232 | B2 * | 9/2008 | Ananthanarayanan | B23K 1/0004 219/59.1 |
| 7,476,824 | B2 * | 1/2009 | Ananthanarayanan | B23K 11/002 219/59.1 |
| 7,877,850 | B2 * | 2/2011 | Wang | B23K 11/115 29/464 |
| 2009/0159570 | A1 * | 6/2009 | Chen | B23K 11/0053 219/119 |
| 2009/0314361 | A1 * | 12/2009 | Silveira | B23K 11/002 137/565.01 |
| 2012/0074104 | A1 * | 3/2012 | Goto | B23K 11/115 219/117.1 |
| 2012/0234799 | A1 * | 9/2012 | Vanimisetti | B23K 11/3018 219/117.1 |
| 2012/0248071 | A1 * | 10/2012 | Ikoma | B23K 11/002 219/104 |
| 2015/0183048 | A1 * | 7/2015 | Oliveira | B23K 11/0046 219/78.16 |
| 2016/0114420 | A1 * | 4/2016 | Makino | B23K 11/34 219/67 |

FOREIGN PATENT DOCUMENTS

| JP | S62 68689 | 3/1987 |
| JP | 2010 038087 | 2/2010 |

* cited by examiner

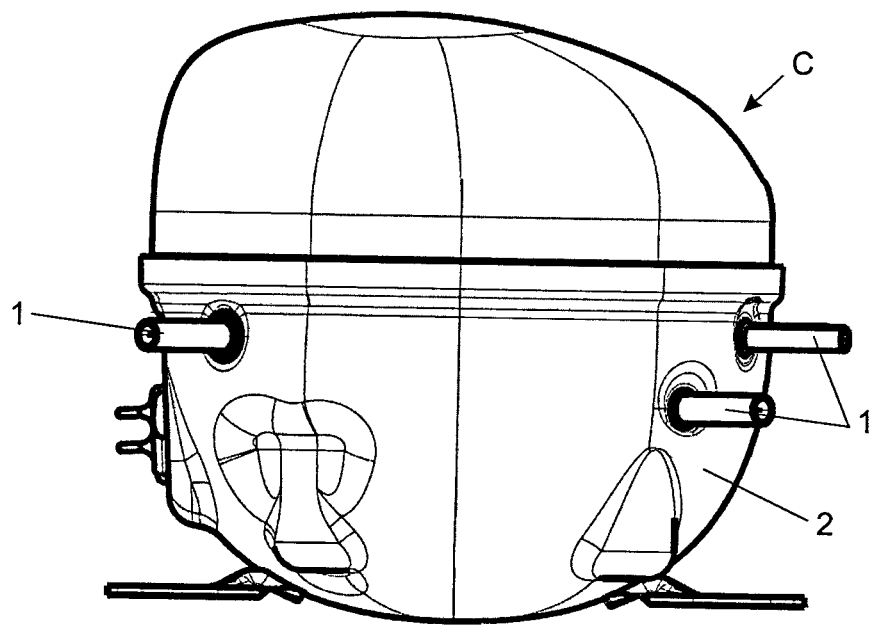
FIG. 1

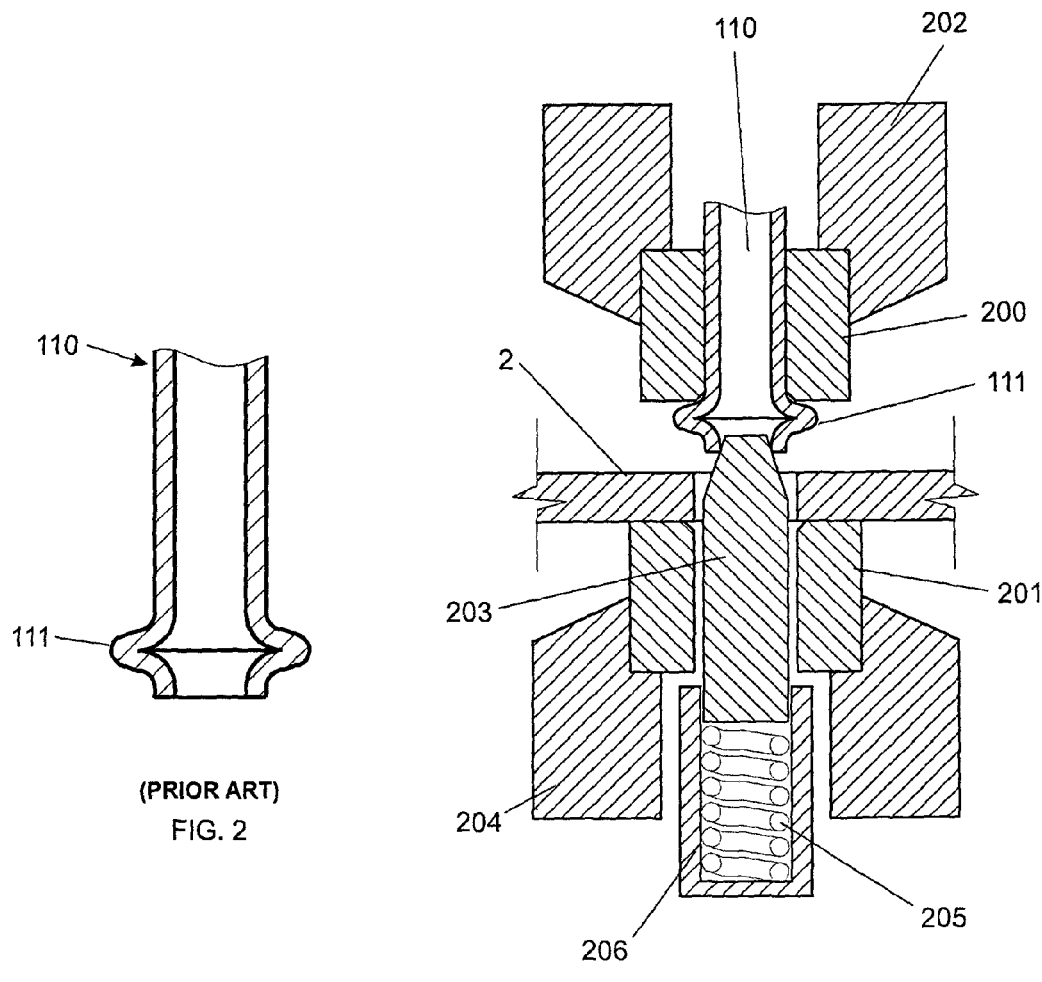
(PRIOR ART)
FIG. 2
(PRIOR ART)
FIG. 3

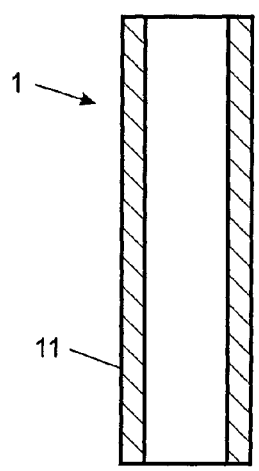
FIG. 4
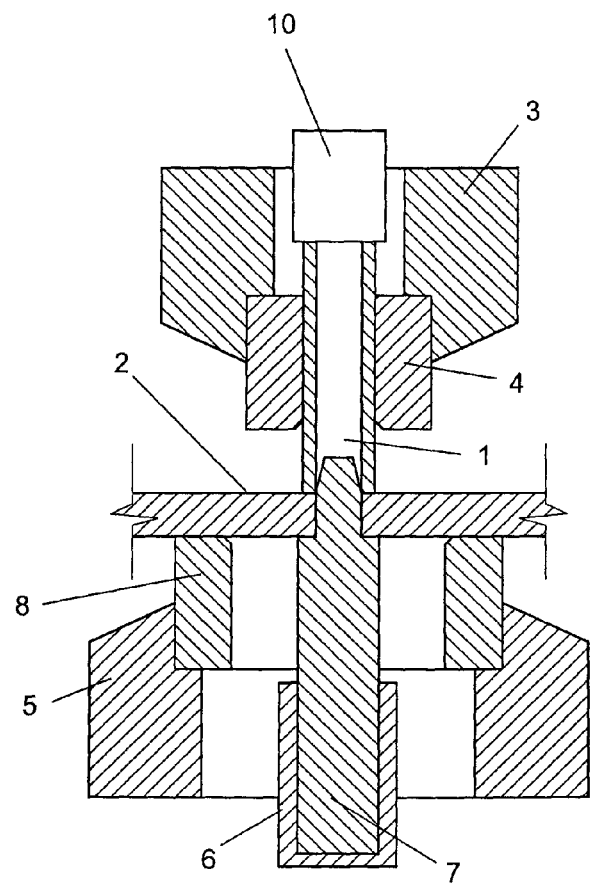
FIG. 5

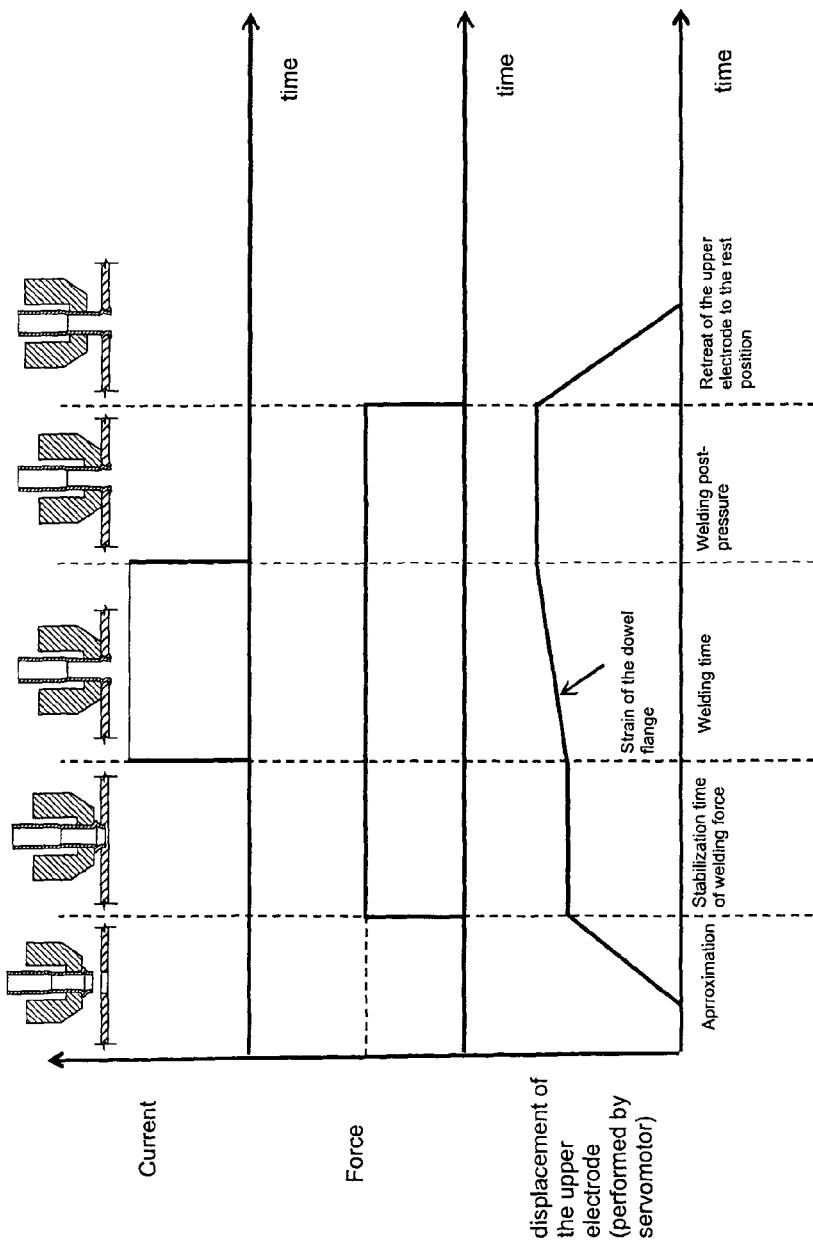
(PRIOR ART)
FIG. 6

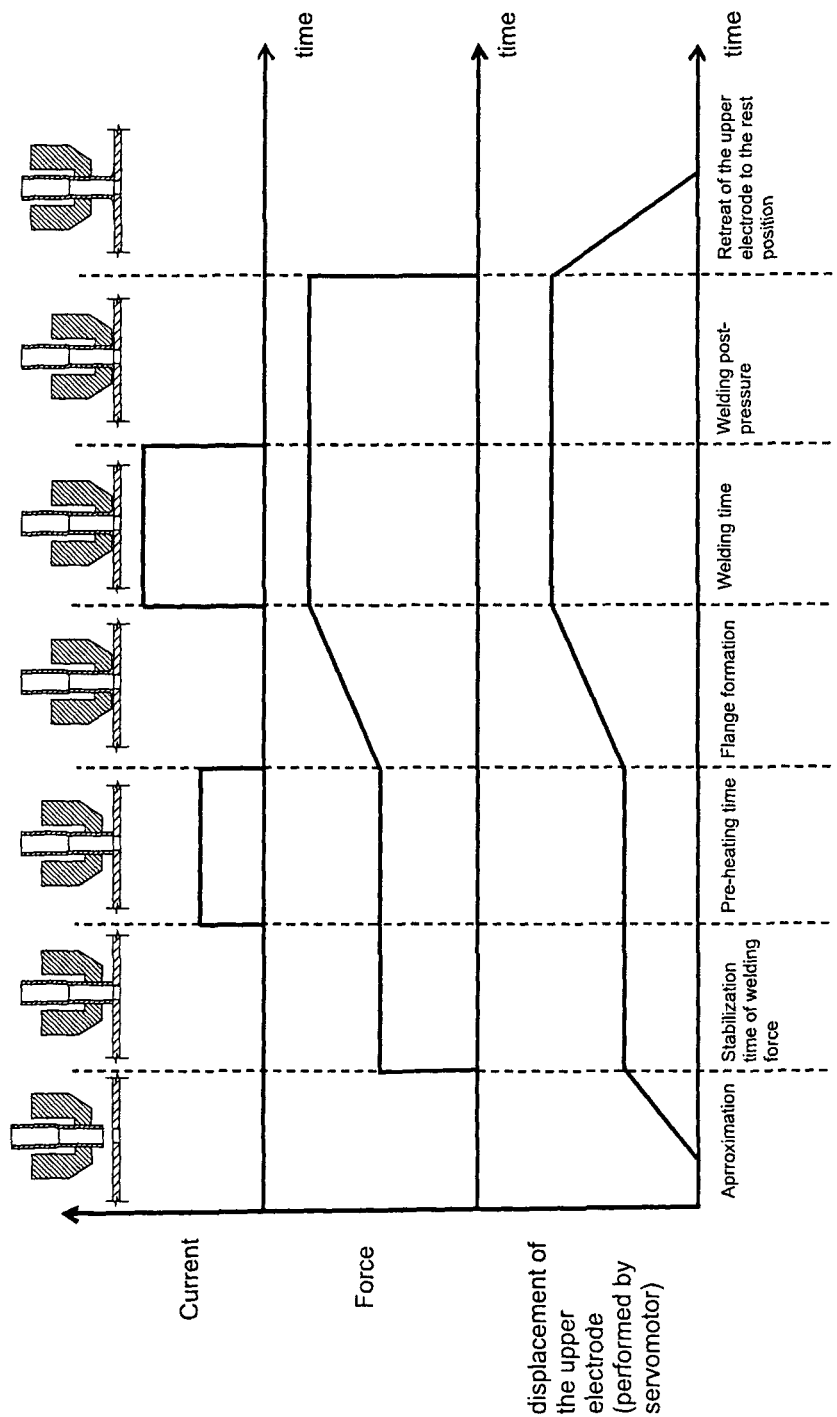
FIG. 7

DEVICE AND PROCESS FOR SIMULTANEOUS SHAPING AND WELDING OF CONNECTOR PIPES FOR COMPRESSORS

CROSS-REFERENCE TO RELATED APPLICATIONS

The present application is a U.S. National Phase of International Patent Application No. PCT/BR2013/000214, filed on Jun. 18, 2013, and claims priority to Brazilian Patent Application No. BR 1020120172798, filed on Jul. 12, 2012, the disclosures and specifications of all of which are expressly incorporated herein in their entirety by reference thereto.

FIELD OF THE INVENTION

The present invention relates to a device and process for shaping and welding, simultaneously performed, pipe connectors (also known as dowels) primarily intended for use in compressors. More specifically the process presented here concerns the simultaneous shaping and welding of copper pipes—used as connectors for suction, process and discharge—to the hermetic compressors metal housing for refrigeration, with the aim of reducing steps of the production process, making it more efficient and economical.

BACKGROUND OF THE INVENTION

As is known in the art, the hermetic compressors are devices widely used in refrigeration systems in general, the components being responsible for providing the circulation of the refrigerant fluid through the tubing of the cooling systems. The suction and discharge connector pipes have the function of conducting the refrigerant gas through the compressor housing, connecting the inside thereof to the pipes of the refrigeration system. The connector tube of process has the function to be the pathway of oil and/or refrigerant fluid injection during installation of the compressor in the refrigeration system. It should be clarified that such connector pipes are typically made of copper due to the ease of connection by brazing with the pipes of the system.

It happens, however, that the proper operation of such equipment also depends on the perfect sealing conditions between these connector pipes and the compressor metal housing, being such connector pipes produced in copper and the compressor housing generally manufactured in steel, such welding process becomes significantly complicated.

The most known form of assembly provides the use of brazing additional materials which are arranged between the hole of the compressor housing and the connector tube as disclosed, for example, in document JP2010038087. Although this document involves the use of a connector pipe without needing prior conformation, such process presents however the disadvantage of needing the use of addition material for welding.

An alternative technique is presented in document CN101780602 (see FIGS. 2 and 3 attached) which provides the use of upper 200 and lower 201 electrodes disposed in order to involve the entire outer surface of connector pipes 110, these electrodes being responsible for the passage of a electrical current from 30,000 to 50,000 Amperes for about 30 to 80 milliseconds to heat the copper and make it pliable to, by applying a compressive force, weld the flange copper of the connector tube 110 on the surface of the housing 2 with which it is in contact. It happens, however, that such process requires the existence of a flange (111) in the body of the copper dowel—that is, the need of further steps in the process, making it more complex and more expensive compared to the solution proposed herein.

Another example of installation of connector pipe in hermetic compressors was disclosed in document PI0603392-0, in which connector pipes 110 previously conformed and also necessarily provided with flanges 111—which constitute the coupling means of the piece—are welded directly to housing 2 of compressor C by means of the application of electrical current through electrodes 200/201. The drawbacks of this process relate to the fact that it is required a prior conformation of flange 111 before the welding operation, requiring a complex operation additional to the production process, and it is more expensive when compared to the solution proposed herein.

Note that all processes of the current state of the art demand the introduction of the ends of connector pipe 110 inside the suction and discharge holes of compressor C. Therefore, it is noted that the current state of the art lacks a welding process which, besides being more efficient, simple and economical, also allows the welding between the parts is of the "top" type, thus eliminating the need of previous shaping of the copper pipes to the production of flanges for welding and eliminating the need to use addition material for brazing. The current technique also lacks a process that allows the shaping and welding of connector pipes to compressor casings to be made in a single step and, therefore, significantly more rapid and economical.

OBJECTIVES OF THE INVENTION

Therefore, it is one objective of this invention to provide a process which simultaneously performs shaping of flange and welding of connector pipes, such connector pipes being copper pipes lacking flange and which, therefore, require no previous shaping prior to its connection (welding) to the compressor housing.

It is also an object of this invention to provide a process for top welding between copper connector pipes and the housing, usually steel, of the compressors.

Another among the objectives of the present invention is to provide a process that simultaneously performs shaping of a flange and welding of connector pipes, which preferably uses a servomotor as element for the generation of force and displacement of the connector pipes against the compressor housing.

It is yet another among the objectives of this invention to provide a process using a stopper for applying compressive force to the connector pipe.

Another objective of the invention is to provide a process in which the welding between the connector tube and the compressor housing is made by applying a force comprised within the range of 200 to 500 kgf in place of the force of about 1100 kgf employed for the welding made by known techniques.

Furthermore, it is an objective of the invention to describe a welding process which uses a guide pin that, besides providing alignment between the connector pipe and the housing hole, it also prevents constriction of the through hole of gas and the connector pipe, during simultaneous shaping and welding steps, also preventing the housing deformation caused by the force of welding, because it is executed with lower electrode of diameter larger than that of the connector pipe.

SUMMARY OF THE INVENTION

The above objectives are achieved by means of a simultaneous shaping and welding device of connector pipes for compressors, such connector pipes being defined by substantially cylindrical bodies which engage to gas through holes existing in the housing of the compressors which constitute its suction and discharge channels.

In one of the main embodiments of the present invention, said device comprises:

a upper electrode-holder cooperating with one of the poles of an inverter set and with transformers;

a upper electrode cooperating with the upper electrode-holder and with the upper region of the connector pipe;

a welding force application stop cooperating with the upper electrode-holder and with the upper end of the connector pipe;

a lower electrode-holder cooperating with the other pole of an inverter set and with transformers;

an electrical insulation means cooperating with the inner surface of the lower electrode-holder;

a lower electrode holder cooperating with the lower electrode-holder and with the compressor housing, being the inner diameter of the bottom electrode equal to or greater than the outer diameter of the upper electrode, and A centralizing pin coupled to the internal region of the electrical insulation means and cooperating with the gas through hole of the compressor housing and with the connector pipe.

Also according to one of the preferred embodiments of the invention, the lower electrode-holder, the electrical isolation means, the lower electrode and the centralizing pin comprise the lower components of the shaping and welding device.

In addition to the upper electrode-holder, the upper electrode and the welding force application stop comprise the upper components of the shaping and welding device.

In short, the device constructed according to a preferred embodiment of the invention comprises means for allowing the top welding between the connector pipe and the compressor housing.

Preferably the inner diameter of the connector pipe is equal to the diameter of the gas through hole of the compressor housing.

Also in a preferred form, the welding force application stop of the instant device functions with intensity comprised within the range of 200 to 500 kgf, more specifically in the range of 330 to 400 kgf.

Preferably the upper device allows the application of current pulses without occurring simultaneous displacement.

The objectives of the invention are also achieved by means of a shaping and welding process of connector pipes for compressors which comprises the use of a shaping and welding device of connector pipes for compressor in order to perform the following steps:

positioning the upper components of the shaping and welding device by means of coupling of the upper electrode around the connector pipe, until the stop for force application located inside the upper electrode-holder reaches the top edge of the connector pipe;

driving the displacement mechanism, preferably a servo-motor to provide the approximation of the connector pipe to the surface of the compressor housing using as positional parameter the end of the centralizing pin which passed through the gas through hole of the compressor housing;

activating the compression and welding force, and its maintenance during an stabilization time;

applying the first pulse of electrical current with intensity ranging between 30 and 50 kA, without allowing displacement of the upper device;

suspending the application of current and allowing the displacement of the upper device with a consequent increase in the welding force to form the flange;

applying the second current pulse effectively consisting in the welding time of the piece;

suspending the current application with maintenance of the force application to provide better welding condition;

shifting the upper electrode to the rest position.

It should be noted that this shaping and welding process comprises, in short, means for shaping and welding, simultaneous and in loco, flange to weld the connector pipe to the compressor housing.

BRIEF DESCRIPTION OF THE DRAWINGS

The present invention will be hereinafter further described based on the drawings.

The figures show:

FIG. 1—a view in elevation of a compressor provided with connector pipes for connection to the pipes of a general cooling system;

FIG. 2—a longitudinal sectional view of a connector pipe used in the current state of the art;

FIG. 3—a schematic sectional view of the components used in the current state of the art to effect the welding between the copper connector pipes and the compressor;

FIG. 4—in longitudinal section view of a copper pipe which can be used for shaping the connector pipe by the process of the present invention;

FIG. 5—a schematic sectional view of the components used in the shaping and welding process of connector pipes of the present invention;

FIG. 6—a variables diagram of the welding process employed in the present state of the art;

FIG. 7—a variables diagram of the shaping and welding process of the present invention.

DETAILED DESCRIPTION OF THE INVENTION

The invention will now be described in detail based on the accompanying drawings, to which are given number reference to facilitate the understanding.

The simultaneous shaping and welding process object of the present invention aims the proper fixation of copper connector pipes 1 to the housing of the hermetic compressors 2, such connector pipes 1 (FIG. 4) defined by substantially cylindrical bodies and of uniform and rectilinear outer surfaces 11—unlike the connector pipes 110 of the current state of the art (FIG. 2), which necessarily must be previously shaped to be fitted with flanges 111 to act like welding surface to the housing 2.

As can be seen in details by FIG. 5 attached, the shaping device of the present invention is comprised, superiorly by an upper electrode-holder 3 which acts connected to one of the poles of the inverter set and transformers, which maintains coupled, in its end, an upper electrode 4 of substantially cylindrical conformation to be coupled to the upper region of the connector pipe 1. The lower component of the shaping device comprises a lower electrode-holder 5 connected to the other pole of the inverter set and transformers, such lower electrode-holder accommodates an electrical isolation means 6, the centralizing pin 7 and a lower electrode 8 whose inner diameter is equal to or greater than the outer diameter of the upper electrode 4, in order to prevent that the electrical current supplied by electrodes 4 and 9 is applied to the inner and outer point of housing 2, which could cause premature wear of the centralizing pin.

For comparative purpose, it should be clarified that as can be seen from FIG. 3 attached, in the welding process used in the current state of the art, lower 201 and upper 200 electrodes are overlapped during welding, resulting in a too high heating that, sometimes, eventually also affect the structure of the compressor housing itself, besides reducing the lifetime of centralizing pin 203, as explained above.

Furthermore, the current technique demands two separate steps for installing the connector pipes to the compressors housings: a previous step of shaping the same to make flange, and another one for welding the pipes already flanged to the compressor housing. In the proposed invention, the two procedures are simultaneously performed in a single step of the process, making it faster and more economical.

As can be seen in FIG. 5, with the device and procedure presented here, the welding is made of top, so that it is possible to use connector pipes 1 with inner diameter equivalent to the diameter of the gas through hole to which the same will be connected. With such a configuration, the welding surface of connector pipe 1 becomes, therefore, its lower edge, eliminating the need of existence of flange which requires prior shaping of the copper pipe. In the present technique, besides being necessary the existence of flange previously shaped on the connector pipe, its end must have a diameter that allows its coupling to the male type hole of the compressor housing (see FIG. 3).

In addition to this facility, it must be noted that the use of centralizing pin 7 prevents the copper, once made ductile by the passage of electrical current from the electrodes 4 and 9, to find passage to deform the inner region of the housing hole 2, that is, it does not obstruct the passage of gas and thus does not interfere with the performance of the compressor.

Another important point herein refers to the compressive force used to implement the process. In the welding processes of the present technique, it is required a compressive force of about 1100 kgf intensity. During the application of this intensity of force, it is made the application of a single current pulse of 30 to 50 kA. The diagram illustrated n FIG. 6 shows graphically the variables current, force and displacement of the upper electrode of the known processes.

In the process of the present invention, due to the construction of the welding device and preferential use of a servomotor, the compressive force necessary for the welding of connector pipe 1 preferably comprises 200 to 500 kgf—that is, much lower than the one demanded by the known processes. Furthermore, in the proposed process, the welding is performed in two steps, namely, by applying two pulses of current: the first pulse for heating the copper, making it more pliable, facilitating the shaping step of the flange, and the second pulse to the effective welding. The Diagram in FIG. 7 schematically illustrates the variables used in the process, besides illustrating the effects of each step of the process.

Thus, the steps of the shaping and welding process of connector pipes for compressors object of the present invention are:

positioning the inner region of housing 2 of compressor C on the lower components of the shaping and welding device, so that centralizing pin 7 is fitted into the fluid through hole;

positioning connector pipe 1 within upper electrode 4, until the stop for force application 10 located inside upper electrode-holder 3 reaches the top edge of connector pipe 1;

driving servomotor to provide approximation of connector pipe 1 to the surface of the compressor housing 2, using as positional parameter the end of centralizing pin 7 that passed through the gas through hole of compressor housing C;

activating the compression and welding force, and maintenance of said force for a stabilization time;

applying the first pulse of electrical current with an intensity ranging between 30 and 50 kA, without allowing displacement of the upper device, that step may be termed pre-heating time;

suspending the current application and allowance displacement of the upper device with consequent elevation of the welding force for shaping the flange;

applying the second pulse of current that will consist, effectively, of piece welding time;

suspending the application current with maintenance of the application of force to provide better welding condition;

shifting the upper electrode to the rest position.

Thus, at the end of the process, the lower end of copper connector pipe 1 which shaped during heating provided by the application of electrical current pulses has settled around the gas through hole of the compressor housing and, due to the force applied by the stop, if acceded to it.

The process object of the present invention also has the advantage that, by virtue of being shaped in loco, it causes the welding material to be integral to the material/body of the connector pipe, thus minimizing the existence of weak points likely to suffer damages or ruptures that could compromise the efficiency of the equipment.

It is noteworthy that although preferred constructive ways of the present invention have been shown, it is understood that any omissions, substitutions, inversion of electrical poles and constructive changes can be made by a technician versed in the subject, without departing from the spirit and scope of protection required. It is also expressly stated that all combinations of elements which perform the same function in substantially the same way to achieve the same results are within the scope of the invention. Substitutions of elements of an embodiment described by others are also fully intended and contemplated.

It should, however, be understood that the description given based on the figures above refers only to some of embodiments feasible to the system of the present invention, while its actual scope is set out in the appended claims.

The invention claimed is:
1. A method comprising:
positioning a housing of a compressor on a lower electrode of a device so that a centralizing pin of the device is fitted into a fluid through hole of the housing of the compressor;
positioning an upper electrode of the device around a pipe connector so that the pipe connector is mechanically coupled to a force application component of the device;
driving the upper electrode of the device so that the pipe connector is placed over the housing of the compressor and the centralizing pin passes through the pipe connector;
during a first time period, applying a first force to the pipe connector using the force application component and applying a first pulse of electrical current to the pipe connector without allowing a displacement of the force application component;

during a second period of time, suspending the application of the first pulse of electrical current and increasing the first force to a second force so that the force application component compresses the pipe connector and a flange is formed on the pipe connector;

during a third period of time, applying a second current, pulse to the pipe connector while maintaining the second force so that the pipe connector is welded to the housing of the compressor;

during a fourth period of time, suspending the application of the second current pulse while maintaining the second force; and moving the upper electrode to a rest position;

wherein an inner diameter of the pipe connector is, equal to a diameter of the fluid through hole of the housing of the compressor, in that a lower edge of the pipe connector is top welded in the housing of the compressor in a welding step.

2. The method of claim 1, wherein the first pulse of electrical current and the second pulse of electrical current are applied using the upper electrode or the lower electrode.

3. The method of claim 1, wherein the driving of the upper electrode of the device is done using a servomotor.

4. The method of claim 1, wherein the first pulse of electrical current is in the range of 30 kA to 50 kA.

5. The method of claim 1, wherein the first force is in the range of 200 kgf to 500 kgf.

6. The method of claim 5, wherein the first force is in the range of 330 kgf to 400 kgf.

7. The method of claim 1, wherein the second force is in the range of 200 kgf to 500 kgf.

8. The method of claim 7, wherein the second force is in the range of 330 kgf to 400 kgf.

9. The method of claim 1, further comprising a step in which during a period of time before the first period of time, the first force is applied to the pipe connector using the force application component while no pulse of electrical current is applied.

10. The method of claim 1, wherein the upper electrode and the force application component are mechanically coupled to an upper electrode-holder.

11. The method of claim 1, wherein the lower electrode and the centralizing pin are mechanically coupled to a lower electrode-holder.

12. A device comprising:
an upper electrode;
a lower electrode;
a force application component;
a centralizing pin;
wherein:
a housing of a compressor can be positioned on the lower electrode of the device so that the centralizing pin of the device is fitted into a fluid through hole of the housing of the compressor;

the upper electrode of the device can be positioned around a pipe connector so that the pipe connector is mechanically coupled to the force application component of the device;

the upper electrode of the device can be driven so that the pipe connector is placed over the housing of the compressor and the centralizing pin passes through the pipe connector;

during a first time period, a first force can be applied to the pipe connector using the force application component and a first pulse of electrical current can be applied to the pipe connector without allowing a displacement of the force application component;

during a second period of time, the application of the first pulse of electrical current can be suspended and the first force can be increased to a second force so that the force application component compresses the pipe connector and a flange is formed on the pipe connector;

during a third period of time, a second current pulse can be applied to the pipe connector while maintaining the second force so that the pipe connector is welded to the housing of the compressor;

during a fourth period of time, the application of the second current pulse can be suspended while maintaining the second force; and the upper electrode can be moved to a rest position;

wherein an inner diameter of the pipe connector is equal to a diameter of the fluid through hole of the housing of the compressor, in that a lower edge of the pipe connector is top welded in the housing of the compressor in a welding step; and wherein an inner diameter of the lower electrode is longer than an outer diameter of the upper electrode.

13. The device of claim 12, wherein the upper electrode is mechanically and electrically coupled to an upper electrode-holder.

14. The device of claim 13, wherein the upper electrode-holder is electrically coupled to a pole of an inverter or a transformer.

15. The device of claim 13, wherein the force application component is mechanically coupled to the upper electrode-holder.

16. The device of claim 12, wherein the lower electrode is mechanically and electrically coupled to a lower electrode-holder.

17. The device of claim 16, wherein the lower electrode-holder is electrically coupled to a pole of an inverter or a transformer.

18. The device of claim 16, wherein the force application component is mechanically coupled to the lower electrode-holder.

19. The device of claim 12, wherein the centralizing pin is located in an electrically insulated arrangement.

* * * * *